United States Patent [19]
Goldie et al.

[11] 3,970,613
[45] July 20, 1976

[54] POLYMERIZATION PROCESS

[75] Inventors: Brian Peter Forsyth Goldie, Cheam, England; Kenneth Clark Kirkwood; Alan William Lightbody, both of Larbert, Scotland

[73] Assignee: BP Chemicals International Limited, London, England

[22] Filed: Mar. 5, 1975

[21] Appl. No.: 555,378

[30] Foreign Application Priority Data
Mar. 8, 1974 United Kingdom............... 10598/74

[52] U.S. Cl................................ 526/104; 526/106; 526/113; 526/194; 526/339; 526/349; 526/352; 526/903; 526/905
[51] Int. Cl.$^2$...................... C08F 4/24; C08F 10/02; C08F 10/04; C08F 10/14
[58] Field of Search............... 260/94.9 D, 94.9 DA, 260/85.3 R

[56] References Cited
UNITED STATES PATENTS

| | | | |
|---|---|---|---|
| 2,891,935 | 6/1959 | Lanning............................. | 260/93.7 |
| 3,239,498 | 3/1966 | Witt................................. | 260/94.9 D |
| 3,378,540 | 4/1968 | Witt................................. | 260/94.9 D |
| 3,562,241 | 2/1971 | Witt................................. | 260/94.9 D |
| 3,819,598 | 6/1974 | Galiano et al. ................ | 260/94.9 D |
| 3,862,104 | 1/1975 | Witt................................. | 260/94.9 D |

FOREIGN PATENTS OR APPLICATIONS
1,150,706   4/1969   United Kingdom

*Primary Examiner*—Alan Holler
*Attorney, Agent, or Firm*—Brooks, Haidt Haffner & Delahunty

[57] ABSTRACT

Process for polymerizing ethylene or mixtures of ethylene with other 1-olefins by contacting the monomer with a titanium modified catalyst that has been pretreated with a hydrocarbon other than the hydrocarbon used as polymerization diluent.

12 Claims, No Drawings

POLYMERIZATION PROCESS

The present invention relates to a process for the polymerisation of 1-olefins.

More particularly the invention relates to the polymerisation of 1-olefins in the presence of a Phillips catalyst. It is known that ethylene, either alone or when mixed with other 1-olefins can be polymerised by contacting the monomeric material with a Phillips catalyst as hereinafter defined. Such processes are for example described in British patent specification Nos. 790,195 and 804,641.

An important commercial process for polymerising ethylene or mixtures thereof with other 1-olefins comprises contacting the monomeric material with a suspension of a Phillips catalyst as hereinafter defined in a liquid hydrocarbon diluent at a temperature such that substantially all of the polymer is produced in the form of solid particles. This type of process is commonly known in the art as the "particle form process" and is described for example in British Patent Specification Nos. 853,414; 886,784 and 899,156.

It is desirable with the aforesaid processes and particularly with the particle form process that the melt index and molecular weight distribution of the product polymers can be controlled independently to provide a variety of grades of polymer each suited for a particular end use. Thus, for example, polyethylene suitable for blow moulding is normally required to have a medium range melt index and a broad molecular weight distribution.

Phillips catalysts can be modified by treatment with titanium compounds to render them capable of polymerising ethylene to polymer having an increased melt index. Titanium modification of Phillips catalysts is well-known and is described for example in UK patent specification Nos. 1,334,662 and 1,326,167. Polyethylenes produced by titanium modified Phillips catalysts can be fabricated into a wide variety of useful articles for example by blow moulding and film blowing techniques.

It is an object of the present invention to provide an improved process for the production of polyethylene or ethylene copolymers. It is a further object to provide polyethylene having a broad molecular weight distribution.

Accordingly the present invention provides a process for polymerising ethylene or a mixture of ethylene and one or more other 1-olefins comprising contacting a titanium modified Phillips catalyst as hereinafter defined, with a first liquid hydrocarbon and then contacting the monomeric material with the catalyst under particle form polymerisation conditions in the presence of a second different liquid hydrocarbon diluent.

It was formerly believed that to be an effective polymerisation catalyst a Phillips catalyst necessarily contains at least some and preferably at least 0.1% by weight of chromium (based on the total catalyst weight) in hexavalent form. Whilst it is true that all known Phillips catalysts do contain hexavalent chromium, recent work has indicated that the catalysts may in fact operate through chromium in any valency state above 3 and it is now believed that chromium in valency states below 6 and above 3 may be present per se in Phillips catalysts and/or formed therein by reduction of hexavalent chromium in the polymerisation system before the commencement of and during the polymerisation.

By a 'Phillips catalyst' is meant throughout this specification a heat activated catalyst comprising chromium oxide and a difficultly reducible inorganic oxide support material, for example, silica, alumina, zirconia, thoria and composites thereof, wherein at least part of the chromium is present in the heat activated catalyst in a valency state suitable for polymerisation. Preferably the Phillips catalyst contains at least 0.1% by weight of chromium (based on the total catalyst weight) in the desired valency state.

It is known that Phillips catalysts can be prepared by depositing chromium oxide (e.g. $CrO_3$) or a chromium compound calcinable to chromium oxide (e.g. chromium nitrate, chromic sulphate, ammonium chromate, tertiary butyl chromate or chromium carbonate) on a support, for example silica, and activating by heating at an elevated temperature. The activation procedure is frequently conducted by heating the dried supported chromium compound at a temperature of approximately 230°–850°C for several hours in such an atmosphere that chromium oxide, at least partially in the hexavalent state, is present in the catalyst at the termination of the heating. It is ordinarily preferred that the heating be conducted in the presence of an oxygen-containing gas such as air.

The total chromium content of such catalysts is generally in the range 0.2 to 30 wt %, preferably 0.5 to 5.0% but can be outside the broad range if desired.

By a "titanium modified Phillips catalyst" is meant throughout this specification a Phillips catalyst wherein the activation thereof was carried out in the presence of a titanium compound.

Titanium modification of Phillips catalysts is well-known and is described for example in UK patent specification Nos. 1,334,662 and 1,326,167 and reference may be made to these specifications for methods of incorporating the titanium in the catalyst.

Examples of titanium compounds that can be used in the production of the modified Phillips catalyst are those represented by the following formulae;

(a) $(R')_n Ti(OR')_m$; (b) $(RO)_m Ti(OR')_n$; (c) $Ti X_4$; (d) $TiO_2$; (e) titanium acetyl acetonate compounds and (f) alkanolamine titanates wherein $m$ is 1, 2, 3, or 4 $n$ is 0, 1, 2 or 3; $m + n = 4$;

wherein the R group is selected from alkyl, aryl, cycloalkyl and combinations thereof, for example aralkyl and alkaryl, each group having 1 to 12 carbon atoms; R' is selected from the group consisting of R, cyclopentadienyl and alkenyl, for example ethenyl, propenyl and isopropenyl each group having 1 to 12 carbon atoms; X is halogen preferably chlorine; when more than one R (or R') group occurs in the titanium compound the groups can be the same or different. Titanium compound represented by the formula $(RO)_4 Ti$ are preferred, particularly the alkyl compounds having from 1 to 6 carbon atoms in each alkyl group for example tetraethyl titanate and tetraisopropyl titanate. The titanium acetyl acetonate compound can be, for example, titanium diacetylacetonate di-isopropylate, titanium dichloro diacetyl acetonate or the so called "titanium acetyl acetonate", "titanyl acetyl acetonate". The alkanolamine titanate can be for example triethanolamine titanate.

The quantity of titanium compound that can be used in the production of the modified catalyst used in the process of the present invention is suitably in the range 0.5 to 8.0% based on the weight of the support material, and preferably in the range 2.0 to 6.0%.

The titanium compound can be incorporated in the catalyst before, during or after the addition of the chromium. The addition of titanium compound is preferably after the addition of the chromium.

The monomeric material used in the process of the present invention may consist of ethylene as the sole monomer when an ethylene homopolymer is desired, or mixtures of ethylene with other 1-olefins for example, propylene, 1-butene, 1-pentene, 1-hexene, 4-methyl pentene-1, 1,3-butadiene or isoprene when it is desired to make copolymers. Preferably not more than about 25 wt % (based on total monomers) of these comonomers are added to the ethylene. Most preferably the invention is used for the homopolymerisation of ethylene.

In the process of the present invention the titanium modified Phillips catalyst is contacted, prior to the polymerisation, with a first liquid hydrocarbon different from the second liquid hydrocarbon diluent. The first liquid hydrocarbon is selected from the group consisting of straight and branched chain paraffinic, cycloparaffinic, olefinically unsaturated, and aromatic hydrocarbons having at least 5 carbon atoms per molecule, examples of such hydrocarbons being n-hexane, n-hexene, n-octane, n-dodecane, isopentane, 2,2,4-trimethyl pentane, cyclohexane and benzene. The hydrocarbons n-hexane and cyclohexane are preferred.

The quantity of the first liquid hydrocarbon employed is not critical. Most suitably the quantity is in the range 0.5 to 1,000%, preferably 50 to 200% based on the weight of the catalyst.

The first liquid hydrocarbon must be substantially dry and free from materials capable of inactivating the catalyst. The first contacting step can be carried out merely by bringing together the activated catalyst and the first liquid hydrocarbon for a period of time in the range 30 mins. to 24 hr. and at a temperature in the range from the freezing point to the boiling point of the liquid, e.g. at atmospheric pressure. The catalyst is then ready for use in the polymerisation. When the first liquid hydrocarbon is capable of polymerising in the presence of the catalyst the first contacting step is preferably carried out under conditions which do not lead to substantial polymerisation.

The second liquid hydrocarbon diluent employed in the process of the present invention can be any hydrocarbon which is chemically inert and non-deleterious to the catalyst under the polymerisation conditions and, in any given process, must be chemically different from the first hydrocarbon. Generally the diluent is selected from paraffins having 3-30 carbon atoms per molecule. Suitable diluents include, for example, isopentane, n-pentane, and isobutane. Isobutane is preferred. The diluent is generally present in a sufficient amount to ensure that the monomer concentration is of the order of 2-10 wt % although concentrations outside this range can be employed if desired. For further examples of liquid diluents that can be employed and other details of the particle form process conditions, reference may be made to the aforementioned specification Nos. 853,414; 886,784 and 899,156.

If desired, the polymerisation can be conducted in the presence of hydrogen gas to increase the melt index of the produced polymer. In general the higher the partial pressure of hydrogen in the polymerisation zone the lower becomes the molecular weight of the produced polymer.

Methods of recovering the product polyolefin are well-known in the art and for further description of recovery techniques reference may be made to the aforementioned British patent specifications.

The process of the present invention can be used to make polyethylenes having a wide range of melt indices and a broad molecular weight distribution. It is particularly useful for the production of polyethylene suitable for blow moulding.

The invention is illustrated by the following Examples wherein Examples 1–3 and 10 are by way of comparison. In the Examples the melt index (MI) and high load melt index (HLMI) were determined according to ASTM method 1238 using 2.16 kg and 21.6 kg loads respectively. The units are grammes per 10 minutes. The melt index ratio (MIR) is HLMI/MI. Kd is a useful indication of molecular weight distribution, high Kd values correspond to broad molecular weight distributions and vice versa. The properties of the polyethylene produced in Examples 1–14 are given in Table 1.

EXAMPLES 1–14

The catalyst used in Examples 1 to 14 was a microspheroidal grade of silica containing 2% chromium oxide sold commercially under the trade name MS 969 by W. R. Grace and G. Davison, Chemical Division, Baltimore, Maryland, U.S.A. The catalyst was predried by fluidising in a dry airstream for 10 hours at 160°C. The predried catalyst was impregnated with 5% Ti by slurrying in isobutane and adding the required amount of titanium tetraisopropylate. After mixing for 4 hours, isobutane was vented off and the last traces of isobutane removed from the catalyst by heating the mixing vessel to 120°C while passing a stream of nitrogen through the catalyst bed. The dried catalyst was activated by fluidising in a dry airstream for 12 hours at 575°C or 600°C and stored under a slight positive pressure of dry nitrogen.

15g of activated catalyst was transferred under nitrogen to a flask containing 50ml dried and degassed hydrocarbon kept under dry nitrogen at 25°C. After treatment time of 2 to 24 hours at 25°C a 2ml sample of settled slurry was taken and used to polymerise ethylene as follows.

A 2 liter stainless steel stirred autoclave was heated to 106°C and purged 5 minutes with dry nitrogen followed by a 20 minute purge with ethylene. The treated catalyst (2ml) was syringed in and the reactor sealed to maintain a slight positive pressure of ethylene (in control runs 0.1g of dry catalyst was used). 1 liter isobutane was charged and ethylene introduced to raise and maintain a pressure of 600 psig (41.4 bar). Polymerisation was allowed to proceed for 60–75 minutes at a controlled reactor temperature of 106° ± 2°C, after which time the reactor was depressured and unreacted ethylene and isobutane flashed off. The product polymer was treated with antioxidant (0.1 wt % Ionol (2-6-di tert butyl p-cresol) and 0.1 wt % lauryl 33-thio dipropionate) before melt index measurements were made.

Table 1

| Example | Hydrocarbon Treatment of a titanium modified Phillips Catalyst | | | | | |
|---|---|---|---|---|---|---|
| | Catalyst Treatment | Treatment time h | Productivity g/g | MI | MIR | Kd |
| 1 | none (control) | — | 3400 | 0.42 | 65 | 4.7 |
| 2 | " | — | 3000 | 0.45 | 65 | 5.1 |
| 3 | " | — | 3400 | 0.41 | 68 | 4.9 |
| 4 | n-hexane | 24 | 1000 | 0.77 | 65 | 6.7 |
| 5 | cyclohexane | 24 | 800 | 1.11 | 63 | 6.9 |
| 6 | " | 6 | 900 | 1.60 | 56 | 7.2 |
| 7 | " | 2 | 1000 | 1.04 | 62 | 7.1 |
| 8 | benzene | 2 | 700 | 1.26 | 64 | 8.5 |
| 9 | " | 4 | 1100 | 0.61 | 62 | 6.8 |
| 10 | none (control) | — | 2900 | 0.37 | 62 | 4.4 |
| 11 | n-octane | 2 | 1100 | 0.61 | 64 | 5.9 |
| 12 | n-dodecane | 2 | 900 | 0.55 | 66 | 6.3 |
| 13 | isopentane | 3 | 1200 | 1.14 | 57 | 5.7 |
| 14 | 2-2-4-tri methyl pentane | 3 | 2400 | 0.36 | 69 | 4.9 |

Note:
The catalyst in Examples 1–9 was activated at 575°C, and in Examples 10–14 at 600°C.

We claim:
1. A process for polymerizing ethylene or a mixture of ethylene and one or more other 1-olefins or 1,3-diolefins comprising contacting a titanium modified heat activated catalyst comprising chromium oxide and a difficulty reducible inorganic oxide support material wherein at least part of the chromium is present in a valency state suitable for polymerization with a first liquid hydrocarbon and then contacting the monomeric material or materials with said catalyst in the presence of a second different liquid hydrocarbon diluent.

2. A process as claimed in claim 1 wherein the titanium compound used in the titanium modification of said catalyst is selected from those represented by the formulae (a) $(R')_n$ Ti $(OR')_m$; (b) $(RO)_m$ Ti $(OR')_n$; (c) $TiX_4$; (d) $TiO_2$; (e) titanium acetyl acetonate compounds; and (f) alkanolamine titanates, whereon $m$ is 1, 2, 3 or 4; $n$ is 0, 1, 2 or 3; $m + n = 4$; the R group(s) are selected from alkyl, aryl, cycloalkyl and combinations thereof, each group having 1 to 12 carbon atoms; R' is selected from the group consisting of R, cyclopentadienyl and alkenyl, each group having 1–12 carbon atoms; X is halogen and wherein when more than one R (or R') group occurs in the titanium compound the groups are the same or different.

3. A process as claimed in claim 1 wherein the titanium compound used in the titanium modification of said catalyst has the formula $(RO_4$ Ti.

4. A process as claimed in claim 3 wherein the titanium compound is tetraisopropyltitanate.

5. A process as claimed in claim 2 wherein the quantity of titanium compound employed is in the range 2.0 to 6.0% based on the weight of the catalyst support material.

6. A process as claimed in claim 1 wherein during the preparation of the said titanium modified catalyst, the titanium compound is incorporated after the chromium had been added.

7. A process as claimed in claim 1 wherein ethylene is the sole monomer.

8. A process as claimed in claim 1 wherein the first liquid hydrocarbon is selected from the group consisting of straight and branched chain paraffinic, cycloparaffinic, olefinically unsaturated and aromatic hydrocarbons having at least 5 carbon atoms per molecule.

9. A process as claimed in claim 8 wherein the first liquid hydrocarbon is n-hexane or cyclohexane.

10. A process as claimed in claim 1 wherein the second liquid hydrocarbon diluent is isopentane, n-pentane or isobutane.

11. A process as claimed in claim 1 wherein the polymerisation is conducted in the presence of hydrogen gas.

12. A process as claimed in claim 9 wherein the second liquid hydrocarbon diluent is isopentane, n-pentane or isobutane.

* * * * *